(12) United States Patent
Paddon et al.

(10) Patent No.: US 8,886,152 B2
(45) Date of Patent: Nov. 11, 2014

(54) EMERGENCY OVERRIDE OF BATTERY DISCHARGE PROTECTION

(75) Inventors: Michael W. Paddon, Tokyo (JP); Craig M. Brown, Harbord (AU); Craig W. Northway, Sydney (AU); Jessica M. Purser, Sydney (AU)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 12/893,892

(22) Filed: Sep. 29, 2010

(65) Prior Publication Data

US 2012/0077454 A1 Mar. 29, 2012

(51) Int. Cl.
*H04M 11/04* (2006.01)
*H04M 1/725* (2006.01)
*H02J 7/00* (2006.01)
*H04W 52/02* (2009.01)

(52) U.S. Cl.
CPC ......... *H02J 7/0031* (2013.01); *H04M 1/72536* (2013.01); *H04W 52/0277* (2013.01)
USPC .......................... 455/404.1; 455/573; 320/136

(58) Field of Classification Search
USPC ............... 455/404.1, 572–573; 320/136, 101, 320/107, 128, 134, 137
See application file for complete search history.

(56) References Cited

U.S. PATENT DOCUMENTS

| | | | |
|---|---|---|---|
| 4,005,344 A | 1/1977 | Gaind et al. | |
| 4,086,525 A | 4/1978 | Ibsen et al. | |
| 4,342,953 A * | 8/1982 | Collins | 320/136 |
| 4,536,695 A | 8/1985 | Lin | |
| 4,902,956 A * | 2/1990 | Sloan | 320/135 |
| 5,095,308 A * | 3/1992 | Hewitt | 340/7.38 |
| 5,179,337 A | 1/1993 | Staarman et al. | |
| 5,343,137 A | 8/1994 | Kitaoka et al. | |
| 5,530,336 A | 6/1996 | Eguchi et al. | |
| 5,838,139 A * | 11/1998 | Greene | 320/133 |
| 6,345,180 B1 * | 2/2002 | Reichelt | 455/404.1 |
| 6,427,072 B1 * | 7/2002 | Reichelt | 455/404.1 |
| 6,668,179 B2 | 12/2003 | Jiang | |
| 6,678,538 B1 | 1/2004 | Koizumi | |
| 6,865,683 B2 | 3/2005 | Taylor et al. | |
| 6,963,763 B1 | 11/2005 | Cannon et al. | |

(Continued)

FOREIGN PATENT DOCUMENTS

| | | |
|---|---|---|
| EP | 0854583 A1 | 7/1998 |
| JP | 2001136679 A | 5/2001 |

(Continued)

OTHER PUBLICATIONS

International Search Report and Written Opinion—PCT/US2011/052774—ISA/EPO—Jul. 4, 2012.

(Continued)

*Primary Examiner* — Nathan Taylor
(74) *Attorney, Agent, or Firm* — Won Tae Kim (57) ABSTRACT

An apparatus, system and method for overriding battery discharge protection in a mobile communication device in the presence of an emergency communication. The method of overriding battery discharge protection in a mobile communication device comprises determining a measured battery voltage; determining an excess battery discharge condition, wherein further battery discharge will result in an impaired ability to recharge a battery; detecting an emergency communication state; disabling battery discharge protection in response to the emergency communication state; and continuing discharge of the battery.

32 Claims, 4 Drawing Sheets

(56) References Cited

U.S. PATENT DOCUMENTS

| | | | |
|---|---|---|---|
| 7,206,567 B2 | 4/2007 | Jin et al. | |
| 7,395,097 B2 | 7/2008 | Perdomo et al. | |
| 7,960,945 B1* | 6/2011 | Onorato et al. | 320/132 |
| 2002/0077159 A1* | 6/2002 | Jiang | 455/572 |
| 2003/0191973 A1 | 10/2003 | Johnson | |
| 2005/0101287 A1* | 5/2005 | Jin et al. | 455/404.1 |
| 2005/0180067 A1* | 8/2005 | Zhang | 361/18 |
| 2005/0231042 A1* | 10/2005 | Kephart | 307/141 |
| 2006/0091858 A1* | 5/2006 | Johnson et al. | 320/128 |
| 2006/0121951 A1 | 6/2006 | Perdomo et al. | 455/572 |
| 2006/0164041 A1* | 7/2006 | Ooshita et al. | 320/150 |
| 2007/0080661 A1* | 4/2007 | Nakashima et al. | 320/107 |
| 2007/0123316 A1* | 5/2007 | Little | 455/573 |
| 2008/0074081 A1* | 3/2008 | Croman et al. | 320/134 |
| 2008/0100267 A1* | 5/2008 | Shen et al. | 320/134 |
| 2009/0045779 A1* | 2/2009 | Sherman et al. | 320/136 |
| 2009/0251104 A1* | 10/2009 | Yamamoto et al. | 320/134 |
| 2010/0011235 A1 | 1/2010 | Finkelstein et al. | |
| 2010/0083008 A1* | 4/2010 | Jakes et al. | 713/300 |
| 2011/0193518 A1* | 8/2011 | Wright et al. | 320/101 |

FOREIGN PATENT DOCUMENTS

| | | |
|---|---|---|
| JP | 2002534827 A | 10/2002 |
| JP | 2008067523 A | 3/2008 |
| JP | 2009182607 A | 8/2009 |
| JP | 2009272299 A | 11/2009 |
| WO | WO9006614 A1 | 6/1990 |

OTHER PUBLICATIONS

PowerBOSS v1.2 by the Jared Company, http://store.pocketberry.com/product.asp?id=62303&n=PowerBOSS, Jul. 27, 2010.

The Jared Company Announces PowerBoss: A New Blackberry® Application Release; PRWEB, Aug. 6, 2010 (http://www.prweb.com/releases/2010/08/prweb4352474.htm).

* cited by examiner

EMERGENCY OVERRIDE OF BATTERY DISCHARGE PROTECTION

FIELD

This disclosure relates generally to apparatus and methods for managing battery discharge in a mobile communication device based upon remaining battery power in the presence of an emergency communication.

BACKGROUND

Once rechargeable battery voltage reaches a minimum threshold voltage, further discharge of rechargeable batteries will result in irreversible chemical changes in a rechargeable battery, destroying a rechargeable battery's ability to recharge, necessitating battery replacement. As rechargeable batteries are typically expensive and, in some devices, awkward to replace, devices that contain rechargeable batteries may contain battery protection circuitry to disable further discharge when the minimum threshold voltage is attained. In these devices, the shutdown voltage is set to the minimum threshold voltage. Thus, reaching the minimum threshold voltage results in the device shutting down to prevent damage to the battery, regardless of the state of the device.

While some devices will shutdown prior to reaching the minimum threshold voltage, for example, due to an inactivity timeout, to save power or to preserve an energy buffer, shutdown still results when the battery reaches the minimum threshold voltage, in order to avoid permanent battery damage.

SUMMARY OF THE INVENTION

An aspect of the present invention may reside in a method of overriding battery discharge protection in a mobile communication device comprising: determining a measured battery voltage; determining an excess battery discharge condition, wherein further battery discharge will result in an impaired ability to recharge a battery; detecting an emergency communication state; disabling battery discharge protection in response to the emergency communication state; and continuing discharge of the battery.

Another aspect of the present invention may reside in a mobile communication device comprising: a battery protection circuit comprising: a circuit configured to determine a measured battery voltage; and a processor configured to: determine an excess battery discharge condition, wherein further battery discharge will result in an impaired ability to recharge a battery; detect an emergency communication state; disable a battery discharge protection in response to the emergency communication state; and continue discharge of the battery.

Another aspect of the present invention may reside in a mobile communication device comprising: means for determining a measured battery voltage; means for determining an excess battery discharge condition, wherein further battery discharge will result in an impaired ability to recharge a battery; means for detecting an emergency communication state; means for disabling battery discharge protection in response to the emergency communication state; and means for continuing discharge of the battery.

Another aspect of the present invention may reside in a computer-readable storage medium comprising program code, to override battery discharge protection in a mobile communication device, stored thereon, comprising code for: determining a measured battery voltage; determining an excess battery discharge condition, wherein further battery discharge will result in an impaired ability to recharge a battery; detecting an emergency communication state; disabling battery discharge protection in response to the emergency communication state; and continuing discharge of the battery.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Figure 1:
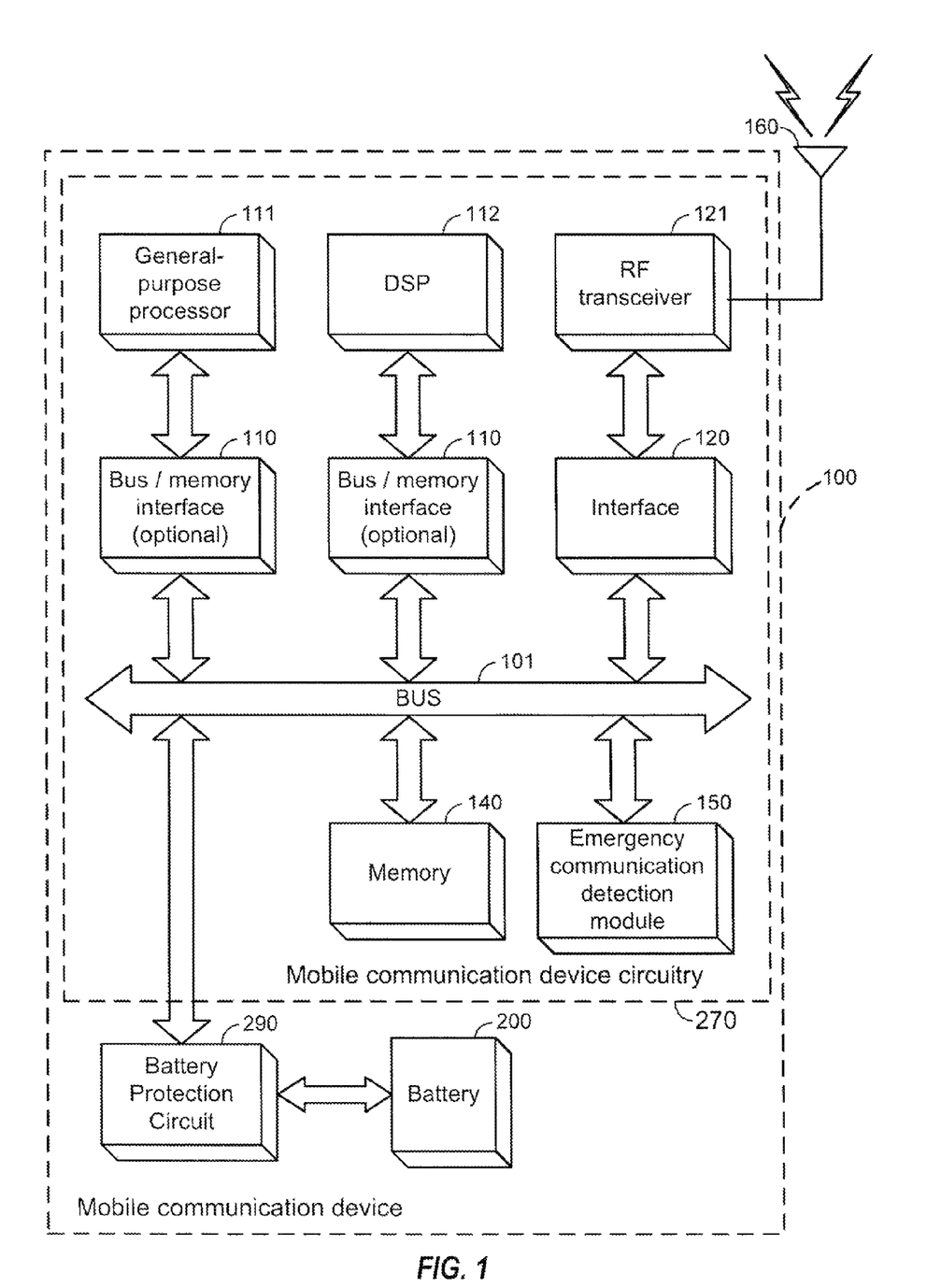
FIG. 1 shows an embodiment of a mobile communication device.

As used herein, mobile communication device 100 refers to a communications-capable device such as a voice-capable device, a text-capable device, a data device or a video-capable device. The communication may be comprised of text, voice, pictures, video, music, or some combination thereof. Other embodiments may be comprised of a combination of voice, text, data or video. The mobile communication device 100 is capable of initiating and/or receiving emergency communication as well as detecting whether emergency communication is being initiated and/or is in progress. FIG. 1 shows a block diagram of one embodiment of a mobile communication device 100. The mobile communication device 100 includes a general purpose processor 111 and a digital signal processor 112 interfaced to bus 101 through an optional bus/memory interface 110. Other embodiments may include different combinations of general and specialized computing resources, for example, including specialized processors such as graphics processors, audio processors, signal processors and global positioning system and satellite positioning system processors. The mobile communication device 100 also includes memory 140 which may encompass but is not limited to multiple memory types such as RAM, ROM, FLASH and EPROM. The mobile communication device 100 includes at least one communications interface such as interface 120 used in conjunction with RF transceiver 121 for wireless communication. The mobile communication device 100 may include miscellaneous interfaces for various types of communication such as an RJ-11 wired phone link or a coaxial Internet link. Various communication session types may be supported such as a VoIP session, over a common interface technology such as WiFi or Bluetooth, a data session over a data link, or a voice session over a wireless WAN link. Other embodiments of communications sessions may also be utilized.

Figure 2A:
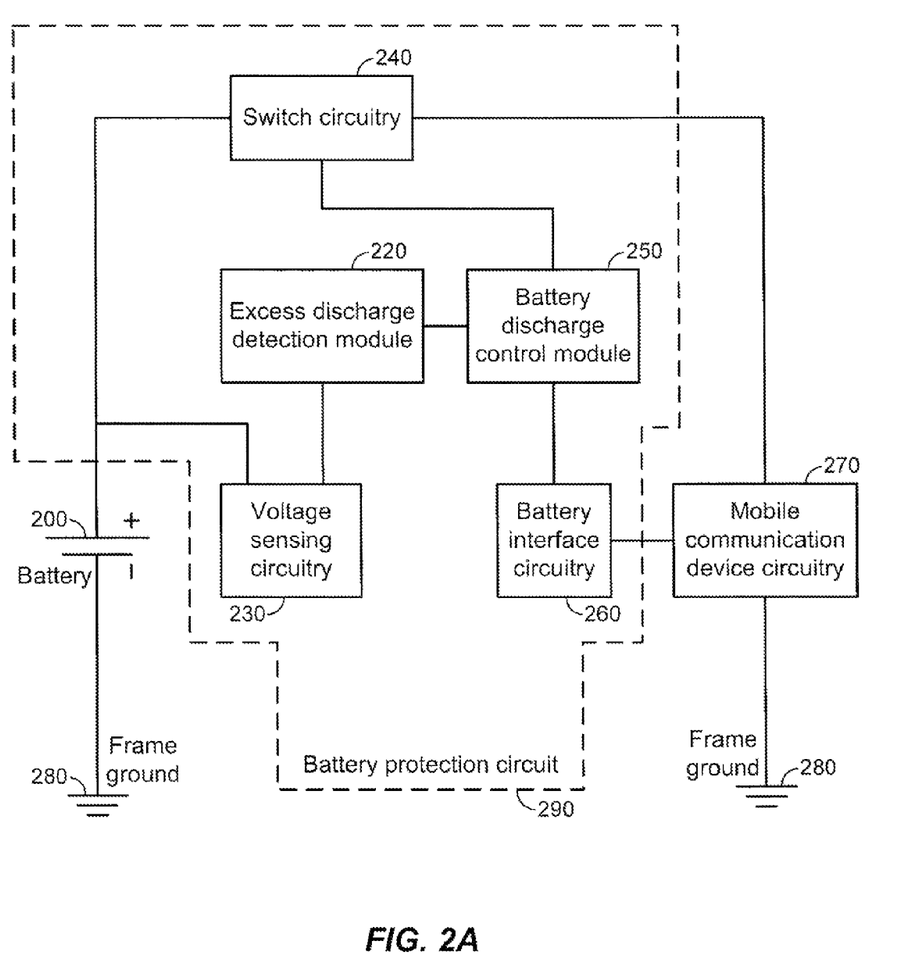
FIG. 2A shows an embodiment of a battery protection circuit in a mobile communication device that comprises voltage sensing circuitry.
Figure 2B:
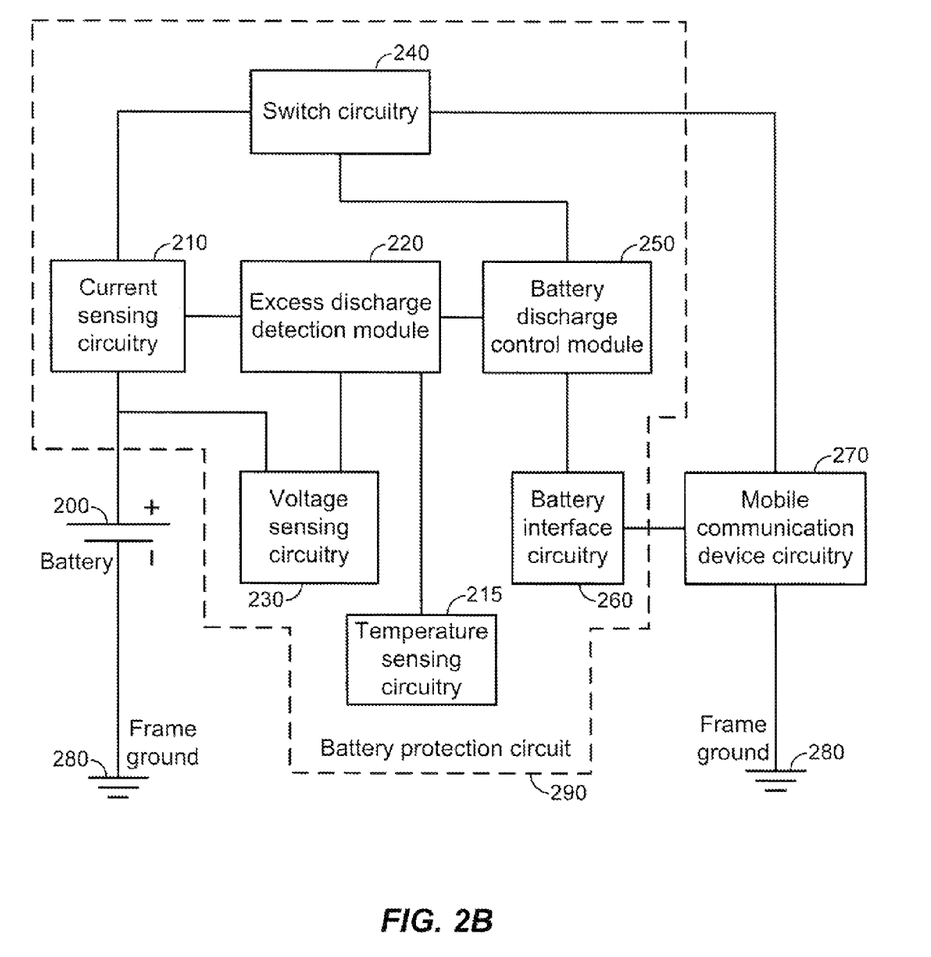
FIG. 2B shows an embodiment of a battery protection circuit in a mobile communication device that comprises voltage sensing circuitry, current sensing circuitry and temperature sensing circuitry.

An emergency communication detection module 150 detects the initiation of and/or presence of emergency communication. The emergency communication detection module 150 can be implemented by various means such as through dial string detection of an emergency number (e.g., 911 in the U.S. or 119 in Japan; the emergency number may vary by the location of the device and/or host carrier), through detection of emergency communications signaling and/or through detection of an ongoing process related to emergency communication. The emergency communication detection module 150 may be implemented in the general purpose processor 111 or in other detection circuitry within the mobile communication device circuitry 270. If emergency communication is detected, signalling is sent to the battery protection circuit 290 via the battery interface-circuitry 260, as shown in FIG. 2. In some embodiments, the battery interface circuitry 260 may be used for non-emergency communication with the battery protection circuit 290 as well. For example, the battery interface circuitry 260 may be used to cause the battery protection circuit 290 to perform generalized power management and selective shutdown controlled by the general-purpose processor 111. Examples could include shutdown due to inactivity or shutdown triggered by particular events or actions.

In some embodiments, commands sent by the mobile communication device circuitry 270 to the battery interface circuitry 260 may be encrypted; for example, encryption may be utilized to prevent viruses and rogue programs from taking over control of the battery protection circuit 290 including the battery discharge control module 250. One embodiment of an encryption capability involves cryptographically signing override and other battery requests by encrypting a SHA-1 hash of the battery command packet using an Elliptic curve cryptography (ECC) private key known to the mobile communication device circuitry 270 and transmitting the encrypted battery command packet to the battery interface circuitry 260. The battery interface circuitry 260, which possesses or has access to the corresponding public key, can decrypt this hash and compare it with its own calculation of the hash. If the two match, then the battery can regard the command as authenticated since it can only have originated from a component holding the private key, in this case, the mobile communication device circuitry 270. Other embodiments may use different encryption schemes to secure communication to the battery and other encryption algorithms such as RSA, MD5, RC4, DES and triple DES.

As used herein, a battery protection circuit 290 refers to a circuit that detects battery voltage levels and protects a battery from excessive discharge by preventing further battery discharge if a minimum threshold voltage is detected wherein the minimum threshold voltage is the voltage beyond which further battery discharge will result in battery damage. Battery damage comprises reducing or eliminating the ability of the battery to recharge. The battery protection circuit 290 includes the ability to disable the ability to prevent further battery discharge after the minimum threshold voltage has been detected if an emergency call condition is present. In some embodiments, the battery protection circuit 290 is also capable of other battery management activities such as shutdown due to inactivity or shutdown or powerup triggered by particular events or actions.

FIG. 2A illustrates one embodiment of a battery protection circuit 290 connected to Battery 200. In one embodiment, Battery 200 may be a lithium ion rechargeable battery. In other embodiments, other rechargeable battery technologies may be utilized comprising, but not limited to, nickel cadmium (NiCd), nickel metal hydride (NiMH) and lithium ion polymer (Li-ion polymer). Battery 200 is connected to voltage sensing circuitry 230. Voltage sensing circuitry 230 measures the battery voltage and provides it to the excess discharge detection module 220 where it is compared against the minimum threshold voltage. If an emergency call is neither in progress nor being initiated, the excessive discharge detection module compares the measured battery voltage to the minimum threshold voltage and, if the measured battery voltage is equal to or less than the minimum threshold voltage, notifies the battery discharge control module 250 to prevent further discharge of the battery by disconnecting the battery from the mobile communication device circuitry 270 via switch circuitry 240. The battery interface circuitry 260 is connected to the mobile communication device circuitry 270 and receives notification of an emergency call initiation and/or an emergency call in progress from the emergency communication detection module 150 (see FIG. 1) within the mobile communication device circuitry 270.

FIG. 2B illustrates another embodiment of a battery protection circuit 290 connected to Battery 200 further comprising current sensing circuitry 210 and temperature sensing circuitry 215. Battery 200 utilizes a rechargeable battery technology comprising lithium ion, nickel cadmium (NiCd), nickel metal hydride (NiMH) or lithium ion polymer (Li-ion polymer). Battery 200 is connected to voltage sensing circuitry 230. Voltage sensing circuitry 230 measures the battery voltage and provides it to the excess discharge detection module 220 where it is compared against a minimum threshold voltage. Battery 200 is connected in series to current sensing circuitry 210. Current sensing circuitry 210 measures the battery current and provides it to the excess discharge detection module 220 where it is compared against a minimum threshold current. Temperature sensing circuitry 215 measures the temperature of battery 200 and provides it to the excess discharge detection module 220 where it may be used to calibrate the minimum threshold voltage and the minimum threshold current values. If an emergency call is neither in progress nor being initiated, the excessive discharge detection module compares the measured battery voltage to the minimum threshold voltage and the measured battery current to the minimum threshold current. It is understood that the minimum threshold voltage and minimum threshold current may be calibrated based, at least in part, upon the battery temperature. Expected current usage for existing levels of operation of the mobile communication device circuitry 270 may also be utilized to calibrate the minimum threshold current. Based upon these factors, the excess discharge detection module 220 determines if excessive discharge has occurred. If excessive discharge has occurred, the excess discharge detection module 220 notifies the battery discharge control module 250 to prevent further discharge of the battery by disconnecting the battery from the mobile communication device circuitry 270 via switch circuitry 240. The battery interface circuitry 260 is connected to the mobile communication device circuitry 270 and receives notification of an emergency call initiation and/or an emergency call in progress from the emergency communication detection module 150 (see FIG. 1) within the mobile communication device circuitry 270. The battery interface circuitry 260 may also receive other information about the mobile communication device circuitry 270 comprising the activity state of the mobile communication device circuitry 270 utilized to calibrate the minimum threshold current.

The battery interface circuitry 260 provides notification to the battery discharge control module 250, disabling the battery discharge control module's 250 ability to disconnect the battery from the mobile communication device circuitry 270, via switch circuitry 240, if an emergency call is in progress or an emergency call is being initiated. Some embodiments may also include current sensing circuitry 210 and temperature sensing circuitry 215 to account for variation in the minimum threshold voltage with varying load and temperature. In these embodiments, the excess discharge detection module 220 will consider measured voltage, current and temperature when determining a calculated voltage to compare against the minimum threshold voltage. It is understood that, in other embodiments, other measures of low battery power may be utilized such as overall or equivalent current flow instead of measured battery voltage. If the calculated voltage is less than or equal to the minimum threshold voltage, the excess discharge detection module 220 will notify battery discharge control module 250. Similarly, if an emergency call is being initiated or is in progress, the battery interface circuitry 260 notifies the battery discharge control module 250. If both an excessive discharge detection notification and a battery interface circuitry 260 notification (of an emergency communication initiated or in progress) are received, the battery discharge control module 250 will disable its ability to disconnect the battery from the mobile communication device circuitry 270, thereby retaining the connection between the battery 200 and the mobile communication device circuitry 270.

In some embodiments, disabling battery discharge protection is reversible, for example, when the mobile communication device is plugged into a charging source, possibly enabling reuse of the battery, if not necessarily at the same capacity. In other embodiments, disabling battery discharge protection is irreversible, for example, to maintain the battery connection while turning the mobile communication device off and then on again during an emergency scenario where the emergency communication attempt may be discontinuous or repeated. In still other embodiments, disabling battery discharge protection may be determined by user-set options or manual overrides.

It is understood that frame ground 280 may be embodied by other means to connect between the battery 200 and the mobile communication device circuitry 270, such as a ground plane in a motherboard.

Figure 3:
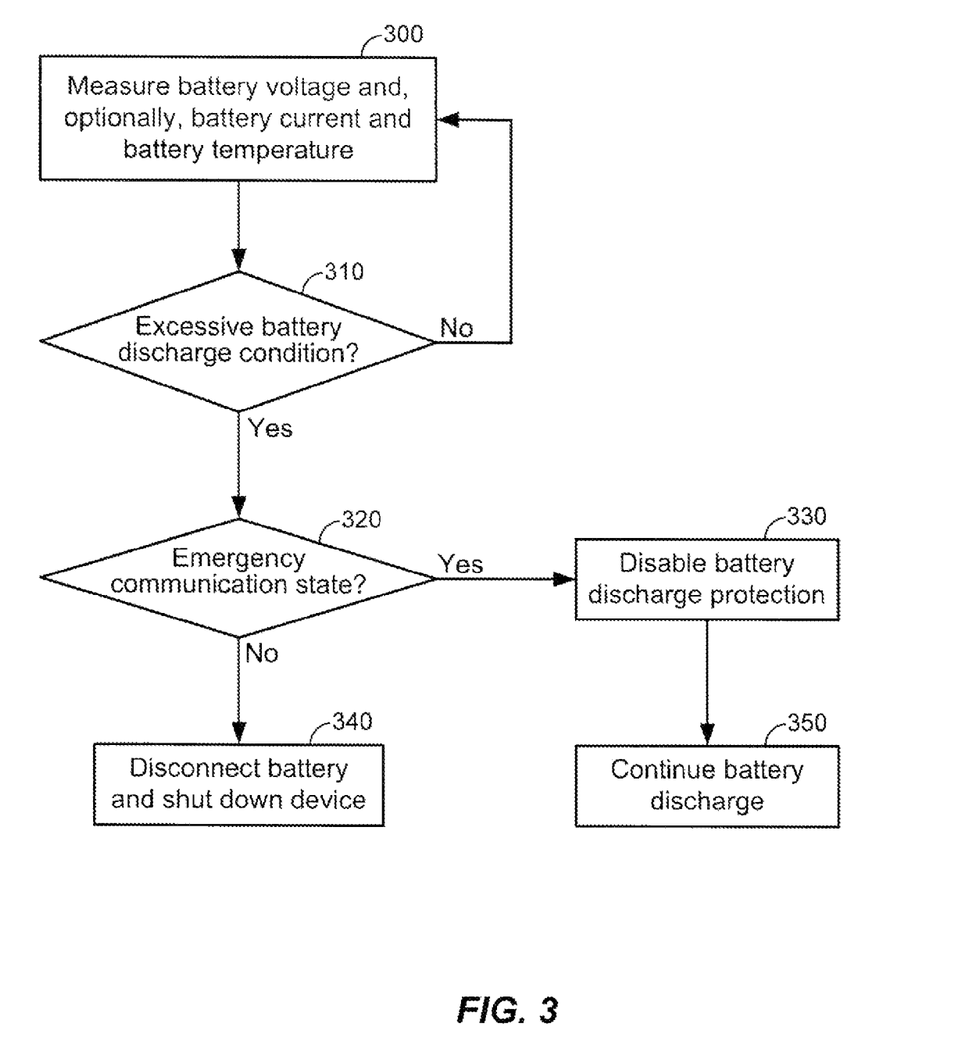
FIG. 3 shows a method of overriding battery discharge protection in a mobile communication device.

FIG. 3 illustrates an embodiment of a method of battery discharge control. It is understood that other similar or equivalent embodiments may be utilized. In step 300, determining a measured battery voltage, battery voltage is measured by the voltage sensing circuitry 230. Some embodiments may also measure battery current utilizing current sensing circuitry 210 and battery or device temperature using temperature sensing circuitry 215. The measurement(s) are provided from the voltage sensing circuitry 230 and, optionally, the current sensing circuitry 210 and the temperature sensing circuitry 215, to excess discharge detection module 220 where, in step 310, determining an excess battery discharge condition, it is determined if an excess battery discharge condition 310 exists, wherein excessive battery discharge has occurred or is about to occur and where further battery discharge will result in an impaired ability to recharge the battery. The impaired ability to recharge the battery may be comprised of irreversible chemical changes to the battery and a permanent inability to recharge the battery to its fullest extent.

If an excess battery discharge condition has occurred or is about to occur, as determined in step 310, it is detected by excess discharge detection module 220 and is communicated to battery discharge control module 250. The battery discharge control module 250 will also note, based upon whether notification of emergency communication has been received by the battery interface circuitry 260, whether an emergency communication state exists, i.e., whether an emergency communication is in progress, as determined in step 320.

If no emergency communication state exists, as determined in step 320, and an excess battery discharge condition exists, as determined in step 310, the battery discharge control module 250 will disconnect the battery 200, via switch circuitry 240, and shut down the device, in step 340. If an excess battery discharge condition, as determined in step 310, has not occurred, the battery discharge control module 250 continues to monitor for excess battery discharge (steps 300 and 310).

If an excess battery discharge condition has occurred, as determined in step 310, and an emergency communication state exists, as determined in step 320, battery discharge protection will be disabled, in step 330. The protection may be disabled by disabling battery discharge control module 250 and battery discharge will continue, in step 350, with the mobile communication device circuitry 270 remaining connected to the battery 200. In some embodiments, disabling battery discharge protection, step 330, may be reversible. For example, battery discharge protection may be reenabled when the mobile communication device 100 is plugged into a charging source or when the emergency use or communication is terminated. In other embodiments, step 330 may be irreversible, allowing the user to shut down and restart the mobile communication device 100 in a battery drained condition, once step 330 has been initiated, regardless of whether an emergency communication is still in progress. Also, in some embodiments, entering step 330 results in logging that a battery over-discharge state has been entered due to an emergency communication. Such logging may be comprised of blowing out a fuse, logging a message or flag in non-volatile memory, and/or non-volatile logging of command packets sent to battery interface circuitry 260 by mobile communication device circuitry 270. The log records may be further comprised of dates, times, reasons and locations of the logged events and of accompanying battery status. For example, the log records may be useful for troubleshooting, diagnosis and warranty purposes.

The methodologies described herein may be implemented by various means. For example, these methodologies may be implemented in hardware, firmware, software, or any combination thereof. For an implementation involving hardware, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The invention claimed is:

1. A method of overriding battery discharge protection in a mobile communication device comprising:
   determining a measured battery voltage;
   determining a measured battery temperature;
   determining an excess battery discharge condition based on a low measured battery voltage,
   wherein the excess battery discharge condition determined based on the low measured battery voltage indicates further battery discharge will result in an impaired ability to recharge a battery, and
   wherein said determining the excess battery discharge condition comprises comparing the measured battery voltage to a minimum threshold voltage, the minimum threshold voltage being calibrated by the measured battery temperature;
   detecting an emergency communication state based upon a command from the mobile communication device indicating emergency communication signaling transmitted to battery interface circuitry;
   disabling battery discharge protection in response to the emergency communication state and the excess battery discharge condition; and
   continuing discharge of the battery.

2. The method of claim 1, wherein said detecting the emergency communication state comprises dial string detecting of an emergency number.

3. The method of claim 1, wherein said detecting the emergency communication state comprises detecting an ongoing process related to emergency communication.

4. The method of claim 1, wherein said impaired ability to recharge the battery comprises a permanent inability to recharge the battery.

5. The method of claim 1, wherein the command is encrypted using a private key.

6. The method of overriding battery discharge protection in a mobile communication device of claim 1, wherein said disabling battery discharge protection is irreversible.

7. The method of overriding battery discharge protection in a mobile communication device of claim 1, wherein said disabling battery discharge protection is reversible.

8. The method of overriding battery discharge protection in a mobile communication device of claim 7, further comprising re-enabling battery discharge protection when the mobile communication device is plugged into a charging source.

9. A mobile communication device comprising:
   a battery protection circuit comprising:
   a circuit configured to determine a measured battery voltage;
   a circuit configured to determine a measured battery temperature; and
   a processor configured to:
   determine an excess battery discharge condition based on a low measured battery voltage, wherein the excess battery discharge condition determined based on the low measured battery voltage indicates further battery discharge will result in an impaired ability to recharge a battery;
   compare the measured battery voltage to a minimum threshold voltage, the minimum threshold voltage being calibrated by the measured battery temperature;
   detect an emergency communication state based upon a command from the mobile communication device indicating emergency communication signaling transmitted to battery interface circuitry;
   disable a battery discharge protection in response to the emergency communication state and the excess battery discharge condition; and
   continue discharge of the battery.

10. The mobile communication device of claim 9, wherein said processor is further configured to detect a dial string comprising an emergency number.

11. The mobile communication device of claim 9, wherein said processor is further configured to detect an ongoing process related to emergency communication.

12. The mobile communication device of claim 9, wherein said impaired ability to recharge the battery comprises a permanent inability to recharge the battery.

13. The mobile communication device of claim 9, wherein the command is encrypted using a private key.

14. The mobile communication device of claim 9, wherein the battery discharge protection is disabled permanently.

15. The mobile communication device of claim 9, wherein the battery discharge protection is disabled temporarily.

16. The mobile communication device of claim 15, wherein the battery discharge protection is re-enabled when the mobile communication device is plugged into a charging source.

17. A mobile communication device comprising:
   means for determining a measured battery voltage;
   means for determining a measured battery temperature;

means for determining an excess battery discharge condition based on a low measured battery voltage,
wherein the excess battery discharge condition determined based on the low measured battery voltage indicates further battery discharge will result in an impaired ability to recharge a battery, and
wherein said means for determining the excess battery discharge condition comprises means for comparing the measured battery voltage to a minimum threshold voltage, the minimum threshold voltage being calibrated by the measured battery temperature;
means for detecting an emergency communication state based upon a command from the mobile communication device indicating emergency communication signaling transmitted to battery interface circuitry;
means for disabling battery discharge protection in response to the emergency communication state and the excess battery discharge condition; and
means for continuing discharge of the battery.

18. The mobile communication device of claim 17, wherein said means for detecting the emergency communication state comprises means for dial string detection of an emergency number.

19. The mobile communication device of claim 17, wherein said means for detecting the emergency communication state comprises means for detecting an ongoing process related to emergency communication.

20. The mobile communication device of claim 17, wherein said impaired ability to recharge the battery comprises a permanent inability to recharge the battery.

21. The mobile communication device of claim 17, wherein the command is encrypted using a private key.

22. The mobile communication device of claim 17, wherein said means for disabling battery discharge protection is irreversible.

23. The mobile communication device of claim 17, wherein said means for disabling battery discharge protection is reversible.

24. The mobile communication device of claim 23, further comprising means for re-enabling battery discharge protection when the mobile communication device is plugged into a charging source.

25. A non-transitory computer-readable storage medium comprising program code, to override battery discharge protection in a mobile communication device, stored thereon, comprising code for:
determining a measured battery voltage;
determining a measured battery temperature;
determining an excess battery discharge condition based on a low measured battery voltage,
wherein the excess battery discharge condition determined based on the low measured battery voltage indicates further battery discharge will result in an impaired ability to recharge a battery, and
wherein said determining the excess battery discharge condition comprises comparing the measured battery voltage a minimum threshold voltage, the minimum threshold voltage being calibrated by the measured battery temperature;
detecting an emergency communication state based upon a command from the mobile communication device indicating emergency communication signaling transmitted to battery interface circuitry;
disabling battery discharge protection in response to the emergency communication state and the excess battery discharge condition; and
continuing discharge of the battery.

26. The non-transitory computer-readable storage medium of claim 25, wherein said detecting the emergency communication state comprises dial string detecting of an emergency number.

27. The non-transitory computer-readable storage medium of claim 25, wherein said detecting the emergency communication state comprises detecting an ongoing process related to emergency communication.

28. The non-transitory computer-readable storage medium of claim 25, wherein said impaired ability to recharge the battery comprises a permanent inability to recharge the battery.

29. The non-transitory computer-readable storage medium of claim 25, wherein the command is encrypted using a private key.

30. The non-transitory computer-readable storage medium of claim 25, wherein said disabling battery discharge protection is irreversible.

31. The non-transitory computer-readable storage medium of claim 25, wherein said disabling battery discharge protection is reversible.

32. The non-transitory computer-readable storage medium of claim 31, further comprising code for re-enabling battery discharge protection when the mobile communication device is plugged into a charging source.

* * * * *